May 9, 1933.  G. J. THOMAS  1,908,459
BRAKE
Filed March 25, 1929

INVENTOR.
George J. Thomas
BY H. O. Clayton
ATTORNEY

Patented May 9, 1933

1,908,459

UNITED STATES PATENT OFFICE

GEORGE JOSEPH THOMAS, OF DETROIT, MICHIGAN, ASSIGNOR TO BENDIX BRAKE COMPANY, OF SOUTH BEND, INDIANA, A CORPORATION OF ILLINOIS

BRAKE

Application filed March 25, 1929. Serial No. 349,745.

This invention relates to brakes and is illustrated as embodied in an internally expanding brake for an automobile.

It is the principal object of my invention to provide a very simple and effective brake mounting wherein the steering knuckle of a dirigible wheel assembly is provided with radially extending integral portions constituting both a reinforcement for the backing plate of the brake and a support for such brake parts as the cam shaft and anchor pins.

With the above construction a straight backing plate or brake support plate is made possible, cheapening the cost thereof. The greater part of the torque reaction normally imposed directly on the backing plate is thus taken by my novel reinforcing knuckle plate.

A further object of my invention relates to the shoe construction of the friction means of the brake wherein a single webbed or T-sectioned brake shoe is provided with stiffening corrugations in the web thereof to materially increase its resistance to buckling.

Further desirable features of brake construction including a novel arrangement of anchor members having a common tie bolt or cotter pin therefor and various other details of construction, and desirable combinations of parts will become apparent from the following detailed description of a preferred embodiment of my invention shown in the accompanying drawing, in which.

Figure 1:
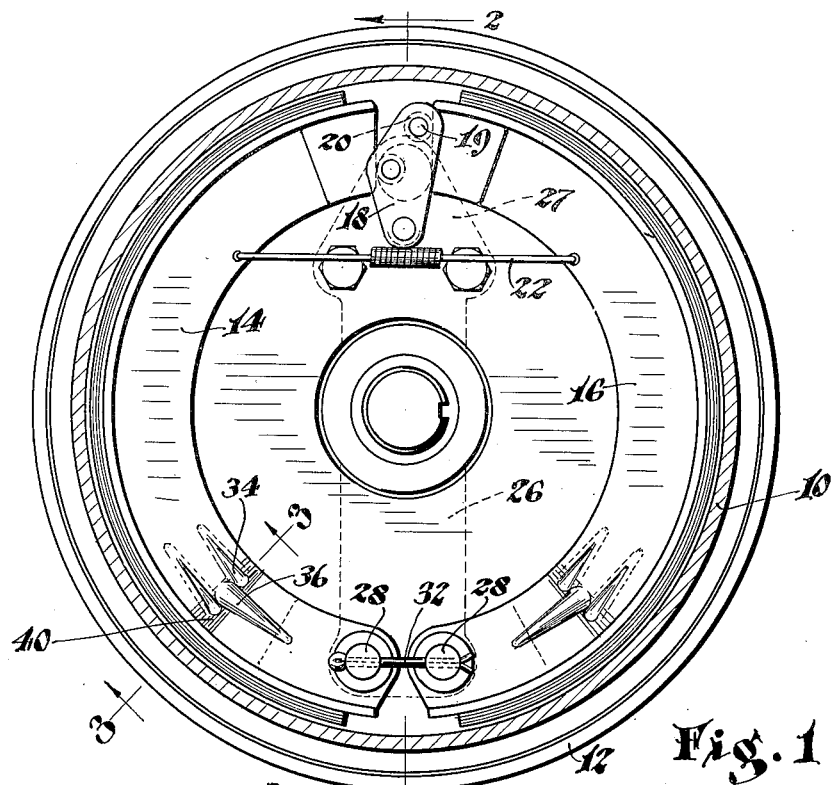
Figure 1 is a vertical section taken just inside the head of the brake drum and disclosing the principal portions of the brake in side elevation.

In that embodiment of my invention disclosed in the drawing, there is provided the usual brake drum 10 at the open side of which there is shown a substantially flat backing plate or brake support plate 12, the two housing an internal expanding type of brake. The brake may comprise two separately anchored T-sectioned brake shoes 14 and 16 spaced apart at their unanchored ends by a cam 18 actuated by the crank arm 11 of a rotatable shaft 21, which cam acts to apply the shoes against the resistance of a horizontally extending return spring 22 secured at its ends to the shoes. Cam 18 preferably comprises two parallel plates supporting pins 19, the latter rotatably supporting thrust rollers 20 contacting the ends of the shoes 14 and 16.

Figure 2:
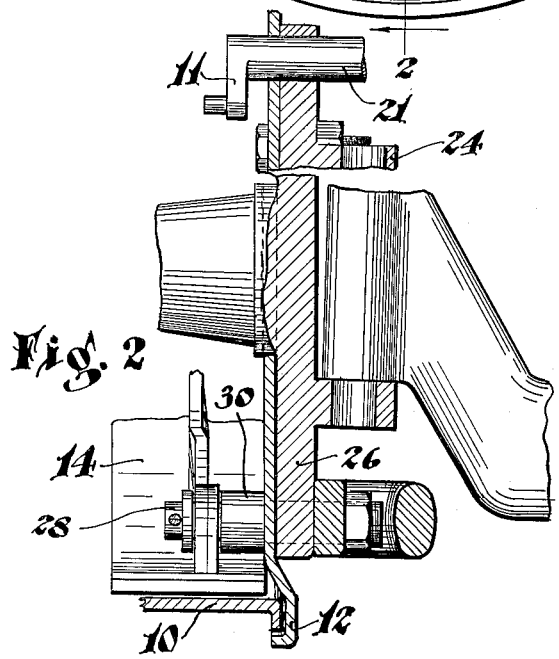
Figure 2 is a partial sectional view taken on the line 2—2 of Figure 1 and disclosing in more detail the novel brake support of my invention.
Figure 3:
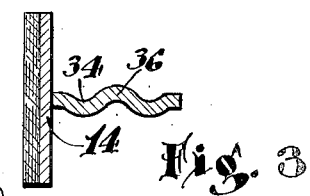
Figure 3 is a transverse section taken through my novel reinforced brake shoe on the line 3—3 of Figure 1.

According to an important feature of my invention, I have provided a novel support plate for parts of the brake wherein the steering knuckle 24 is made integral with a relatively narrow and vertically extending reinforcing plate 26 of appreciable thickness, all as indicated in Figure 2. The plate 26 is preferably extended at its center to form the tapered wheel spindle and is furthermore wedge-shaped at its upper end 27. The cam shaft 21 may be journaled in the end 27 which provides, in conjunction with the backing plate 12, a very rigid bearing support for the shaft.

According to a further feature of the invention, the lower end of the plate 26 functions as a double bearing for the two juxtaposed anchor pins 28 of the brake, the latter being preferably spaced from the support plate 12 by spacers 30. A single cotter pin 32 may be passed through the ends of the pins, which pin serves to laterally retain the spaced apart ends of the brake shoes which are pivoted to said anchor pins.

An important minor feature of the invention resides in the construction of the webs of the brake shoes which may be reinforced adjacent their anchored ends by spaced parallel and relatively narrow corrugations 34 preferably pressed out from the body of the web toward the backing plate. A third outwardly extending corrugation 36 may extend parallel to and somewhat between the first mentioned corrugations as disclosed in Figure 1, and the body of the web may furthermore be offset at 40 toward the backing plate 12 and into a plane parallel to the principal portion of the web body.

The aforementioned corrugations or indentations provide a very economical means for materially strengthening the anchored end of the brake shoes and the combination of the knuckle reinforcing plate 26 and brake support plate provide a very rigid torque taking, brake supporting and strengthening structure.

While one illustrative embodiment has been described in detail, it is not my intention to limit the scope of the invention to that particular embodiment, or otherwise than by the terms of the appended claims.

I claim:

1. A wheel and brake structure comprising, in combination, a combined wheel and brake mounting including a one piece spindle, knuckle and relatively thick rectangularly shaped brake support plate, together with a relatively thin brake backing plate secured to said aforementioned support plate.

2. A wheel and brake structure comprising, in combination, a combined wheel and brake mounting including a one piece spindle, knuckle and relatively thick brake support plate, together with a relatively thin brace backing plate secured to said aforementioned support plate and brake operating and brake anchoring members positioned respectively above and below said knuckle and extending through said plates.

3. A brake structure for a vehicle wheel, comprising a one piece wheel knuckle and vertically extending brake reinforcing plate, in combination with a brake operating element and a brake anchoring element extending respectively through said plate at its upper and lower extremities.

4. A brake comprising brake shoes characterized by the webs thereof having laterally spaced relatively narrow corrugations, in combination with an offset in said web.

5. A brake comprising a backing plate and a brake shoe having a web with corrugations pressed from the body of the web toward the support and said web having an offset portion parallel to the main portion and nearer the plate than the main portion.

In testimony whereof, I have hereunto signed my name.

GEORGE JOSEPH THOMAS.